United States Patent
Radojevic et al.

[11] Patent Number: 5,809,426
[45] Date of Patent: Sep. 15, 1998

[54] ARRANGEMENT IN MOBILE TELECOMMUNICATIONS SYSTEMS FOR PROVIDING SYNCHRONIZATION OF TRANSMITTERS OF BASE STATIONS

[75] Inventors: Milan Radojevic, Haninge; Staffan Carlsson; Göran Nilsson, both of Nynäshamn, all of Sweden

[73] Assignee: Telefonaktiebolaget LM Ericsson, Stockholm, Sweden

[21] Appl. No.: 411,630

[22] PCT Filed: Oct. 18, 1993

[86] PCT No.: PCT/SE93/00849

§ 371 Date: May 12, 1995

§ 102(e) Date: May 12, 1995

[87] PCT Pub. No.: WO94/10768

PCT Pub. Date: May 11, 1994

[30] Foreign Application Priority Data

Oct. 27, 1992 [SE] Sweden .................................. 9203137

[51] Int. Cl.[6] ........................................................ H04B 7/00
[52] U.S. Cl. ............................ 455/502; 455/524; 375/356
[58] Field of Search .................. 455/51.1, 51.2, 455/54.1, 54.2, 56.1, 18, 57.1, 33.1, 33.2, 63, 503, 502, 517, 524, 526, 439; 375/356, 358

[56] References Cited

U.S. PATENT DOCUMENTS

| 4,696,052 | 9/1987 | Breeden | 455/503 |
|---|---|---|---|
| 4,742,514 | 5/1988 | Goode et al. | 455/51.1 |
| 4,850,032 | 7/1989 | Freeburg | 455/503 |
| 5,404,575 | 4/1995 | Lehto | 455/51.1 |

FOREIGN PATENT DOCUMENTS

WO92/13417  8/1992  WIPO.

*Primary Examiner*—Edward F. Urban
*Attorney, Agent, or Firm*—Burns, Doane, Swecker & Mathis, L.L.P.

[57] ABSTRACT

An arrangement in a mobile telecommunication system which has two or more base stations having transmitting elements which are each arranged to operate with a respective real-time clock and a time-comparing element. A central coordinating unit in the system is arranged to transmit a first time signal to an element arranged in the base station for receiving the first time signal. The first time information is then transferred together with a second time information to the time-comparing element. The second time information is set up by the real-time clock in the transmitting element. The first time information and second time information are placed in relation to one another and, in dependence on the relationship between these and existing criteria, for example delays and the like, the time-comparing element adjusts the real-time clock so that synchronization is carried out.

8 Claims, 2 Drawing Sheets

ARRANGEMENT IN MOBILE TELECOMMUNICATIONS SYSTEMS FOR PROVIDING SYNCHRONIZATION OF TRANSMITTERS OF BASE STATIONS

BACKGROUND

The present invention relates to an arrangement for producing, in mobile telecommunication systems which operate with base stations transmitting to mobile units, a central synchronization of the transmitters of each respective base station, taking into consideration propagation time delay, delays in the cabling, transmitters and so forth.

The invention is also of the type which operates with information-receiving elements, a real-time clock and comparing elements.

Base stations operate in mobile radio communication systems with coverage areas. When the coverage areas partly overlap one another or interfere with one another, a manual or automatic synchronization process is used. In automatic synchronization systems, it is usually a base station the internal clock of which is assumed to be reference clock, a master clock. The base station which is provided with the master clock then carries out a sequential synchronization of the internal clocks, slave clocks, of the other affected base stations. Using a reference time signal, transmission takes place from the affected base station which operates with the reference clock, the master clock. The signal is received in the regular receivers of the other affected base stations which receivers adjust their internal clocks to the reference time. After that, the synchronized base station establishes communication with a new base station which is then synchronized to it, and so forth. The base station which is provided with a reference clock function/master clock function is frequently arranged with an atomic clock.

In connection with mobile systems belonging to this category, a plurality of methods have been proposed for synchronizing the transmitters in the base stations. The methods have included synchronization of single base stations or parts of the transmitter network.

SUMMARY OF THE INVENTION

Today's modern mobile telecommunication systems presuppose that the mobile units can flexibly move within the total propagation range of the system at the same time as the greatest possible attention can be paid to the mobile units being located within areas, where the coverage areas of one or more base stations overlap one another, when it is of highest priority that the base stations are synchronized with one another with respect to time.

It should be possible to carry out this synchronization in such a manner that the synchronization is effected at the same time in all transmitters of the base stations which are to be synchronized on the occasion in question. Furthermore, the synchronization should not occupy channel resources in the mobile system. It should be possible to carry out the synchronization in such a manner that the synchronization effects influences on/adjustments of the internal real-time clocks with which the base stations are operating. The invention is intended to solve the abovementioned problems, among others.

In one embodiment of the subject matter of the invention, an internal real-time clock is utilized in the base stations, which clock should be able to be allocated a standardized time or be referred to such a time. This time should be the same for all transmitters of the base stations in the total system. The invention is intended to solve this problem as well.

In one embodiment of the subject matter of the invention, a common time information is utilized, which is transmitted from a central coordinating unit. It should be possible for this time information to consist of a standardized time signal which should be referred to a standardized time or consist of such a time. The invention also intends to solve this problem. In one embodiment of the invention, it should be possible to compensate for a time delay which is produced in the station S itself. The invention is also intended to solve this problem.

In one embodiment of the invention, it should be possible to synchronize the total coverage area of the whole mobile telecommunication system. The invention is also intended to solve this problem.

In one embodiment of the invention, a buffer is utilized in which it should be possible to distribute outgoing transmit data with respect to time to affected mobile units in such a manner that the transmission is synchronized for one or more base stations. The invention is is also intended to solve this problem.

In one embodiment of the invention, elements for receiving a common time information are utilized. It should be possible to adapt this time information to a format which is comprehensible to the system. The invention is also intended to solve this problem.

In one embodiment of the arrangement, communication elements are utilized in which it should be possible to input transmit data as is a common time information. The invention is also intended to solve this problem.

If desired, the invention should constitute a digital telecommunication system, base stations operating with transmitters, which stations operate with paging. The invention solves this problem as well.

That which can be mainly considered as being characterizing of an arrangement according to the invention is that all base stations in the system are provided with, on the one hand, transmitting elements which are arranged to operate with a real-time clock allocated to them and, on the other, time-comparing elements. A further characteristic is that the system is provided with a coordinating unit which is arranged to transmit a common time information to the base stations in the system and that the said base stations are arranged with elements for receiving the common time information and supplying the common time information to the time-comparing element together with a second time information. This second time information is established in the base station and related to a time which a real-time clock in the transmitting element is operating with. Furthermore, the comparing element is arranged to put the said common time information and the said second time information into relation with one another. The relation between the common time information and the second time information together with existing criteria, for example delays and the like, effects influences on/adjustments to the real-time clock included in the base station in such a manner that the synchronization is carried out.

In one embodiment of the concept of the invention, the internal real-time clock is allocated a real-time which refers to or is constituted by a reference time to solar time at the zero meridian in longitude, UTC time.

In a further embodiment of the concept of the invention, the common time information which is transmitted from the said coordinating unit to the receiving elements of the base stations is a standardized signal, a GPS signal.

In a further embodiment of the concept of the invention, the time delay which is occasioned in the station S itself is compensated for by the internal real-time clock in each base station being set/adjusted to the time unit T in advance of the current time.

In a further embodiment of the subject matter of the invention, the said time synchronization includes all base stations operating with transmitters in the total coverage area of the network.

In a further embodiment of the concept of the invention, a closed phase-locking system is established in which the comparing element together with the element for receiving the first common time information, the internal real-time clock and existing criteria form the said system.

In a further embodiment of the subject matter of the invention, the transmitting elements included in the base stations are arranged to operate with a buffer function. This buffer function is coupled to a pulse-generating unit which generates the signals which are required for synchronized transmission.

In a further embodiment of the subject matter of the invention, the element for receiving the common time information, which element is constituted by a GPS signal, is processed into a comprehensible format before it comes into the comparing element, i.e. the same format as the one that the internal real-time clock operates with.

In a further embodiment of the subject matter of the invention, the base station is arranged with communication elements. These communication elements are on the one hand set up for transmitting transmit data to the transmitter and on the other hand set up for transmitting time information (the GPS signal) to the comparing element.

In a further embodiment of the subject matter of the invention, the said mobile communication system is a digital mobile network. The digital mobile network operates with paging. The mobile units which are served are pagers.

An effective synchronization of one or more base stations operating with transmitters can be effected by what has been proposed above. The synchronization is carried out simultaneously in two or more base stations operating with transmitters in the mobile telecommunication system. The invention is also arranged in such a manner that consideration can be given to the internal delays which can be produced by the system per se, delays in cabling, transmitters, antennas and so forth. The invention is arranged in such a manner that all transmitters in the system can be encompassed by the synchronization. All transmitters in the system will therefore always effect transmission of information in coordination with one another. The result of this is that a mobile unit (pager) in the system can always make large movements. The mobile unit also always obtains a time-coordinated information from the base stations in situations in which the mobile unit is located in areas where the coverage areas of two or more base stations overlap one another.

BRIEF DESCRIPTION OF THE DRAWINGS

A currently proposed embodiment of an arrangement which exhibits the characteristics significant of the invention will be described below whilst at the same time referring to the attached drawings in which.

DETAILED DESCRIPTION OF A PREFERRED EMBODIMENT

Figure 1:
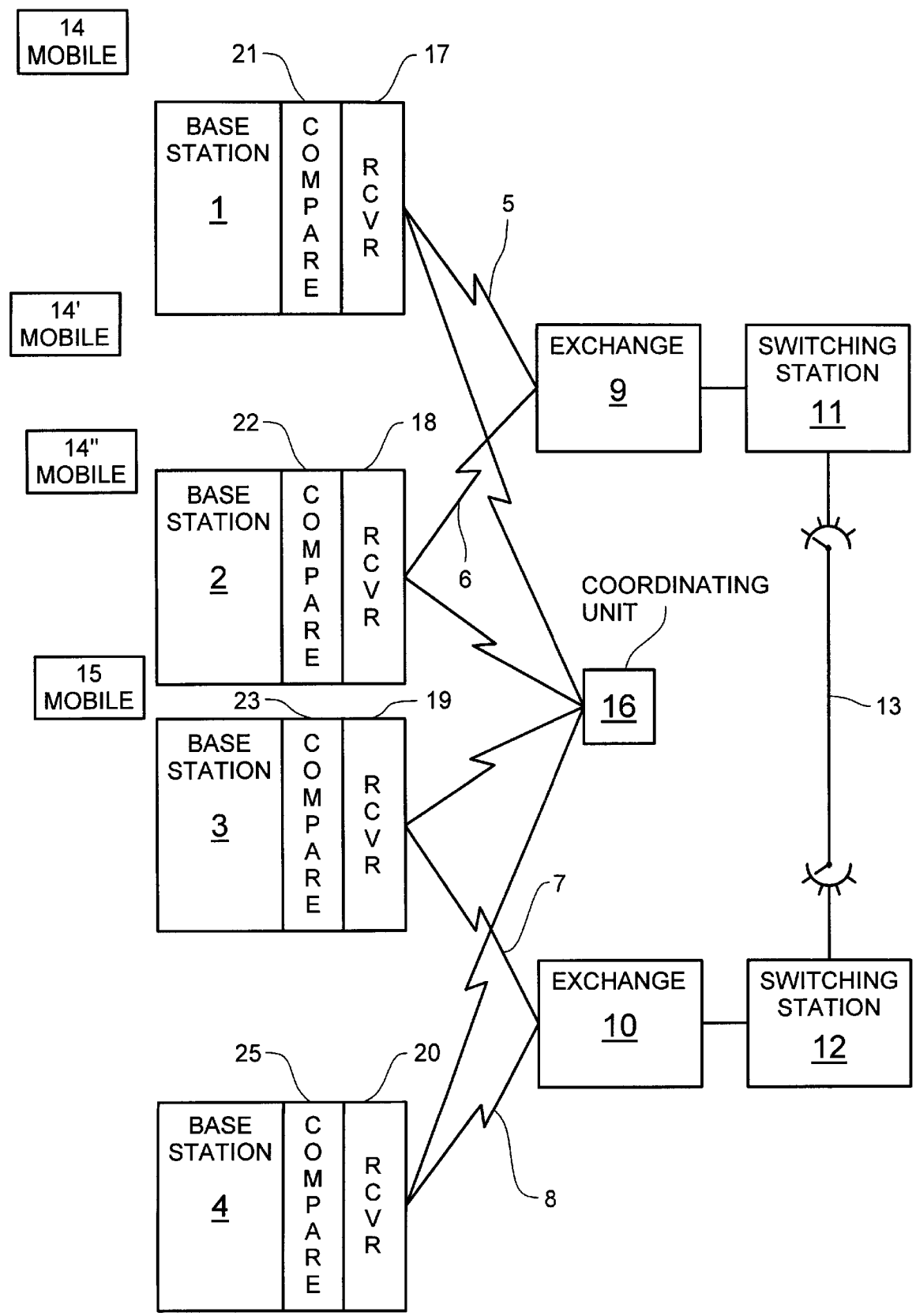
FIG. 1 shows in basic diagram form a mobile telecommunication system including a central coordinating unit.

FIG.1 shows a mobile telecommunication system. A number of base stations is connected to the system. These are represented by 1, 2, 3, 4 in the figure. The base stations, in turn, are connected via a fixed connection 5, 6, 7, 8 to a number of mobile telephone exchanges represented by 9 and 10. The mobile telephone exchanges, in turn, are connected via switching stations 11, 12 to the landline telephone network 13. A number of mobile units 14, 14', 14", 15 is connected to the base stations 1, 2, 3, 4. On a call to a mobile unit 14, 14', 14", 15, a contact is established from the public telephone network 13 via the switching stations 11, 12 to the mobile telephone exchanges 9, 10, which command the base stations 1, 2, 3, 4 to make a call to the required mobile unit 14, 14', 14", 15. The base station 1, 2, 3, 4 within whose coverage area the mobile unit 14, 14', 14", 15 is located establishes contact, whereupon the call information is transferred (information on the caller's identity in a paging system). In those cases where the mobile unit 15 is located within the coverage area of one or more base stations 2, 3, the mobile unit decides with the aid of, among others, the strength of the carrier wave, which base station 2, 3 it should connect itself to. When the mobile unit 15 is located within the area where the coverage areas of one or more base stations 2, 3 overlap one another, it is highly preferred that the call goes out synchronously from the affected base stations 2, 3. To obtain a synchronous transmission from all the base stations 1, 2, 3, 4 in the system, a coordinating unit 16 is arranged. The coordinating unit 16 transfers a common time information to elements for reception 17, 18, 19, 20 intended for this purpose and arranged at each respective base station 1, 2, 3, 4. This common time information is compared with a second time information set up by the said base stations 1, 2, 3, 4. This second time information is referred to or consists of a time which is referred to solar time at the zero meridian in longitude, UTC time, and is affected by the time delays which are produced in the station itself. The common time information is then placed into relation, in the comparing element 21, 22, 23, 24 of the affected base stations, with the said second time information, whereupon the comparing element effects influences on/adjustments of the real-time clocks in the affected base stations so that a time synchronization of the base stations 1, 2, 3, 4 is carried out.

Figure 2:
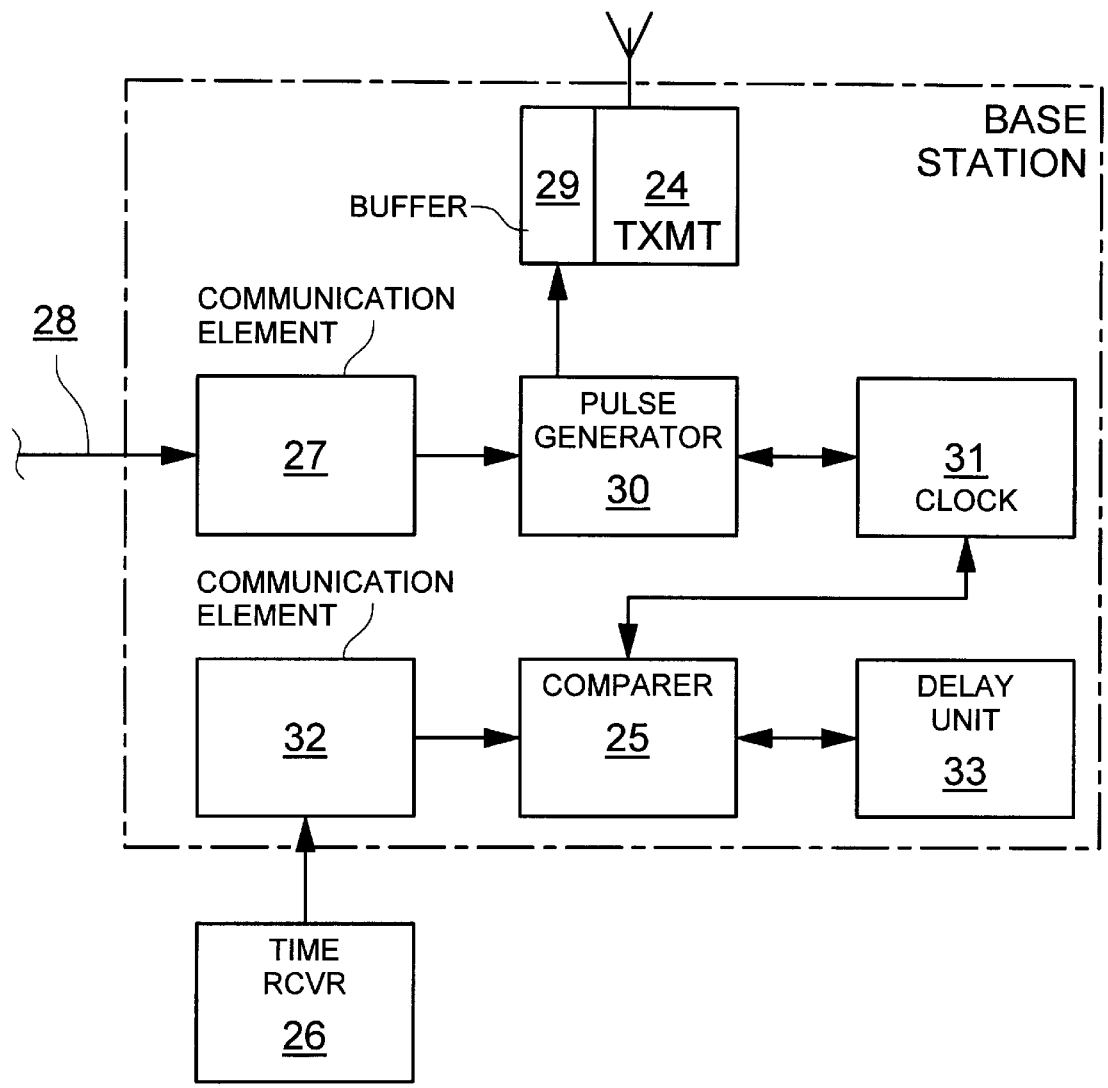
FIG. 2 shows in basic diagram form a base station including receiving elements, comparing elements and transmitting elements

FIG. 2 shows a base station included in the mobile telecommunication system. The base station is provided with a transmitting element 24 for outgoing transmit data, a time-comparing element 25 and an element 26 receiving the common time information. Outgoing data which are to be transmitted from the transmitting element 24 arrive at the base station via a first communication element 27. The first communication element 27 is connected to the mobile telephone exchange via a landline connection 28. The outgoing transmit data are then transferred to a buffer 29 included in the transmitting element 24. The outgoing transmit data in the buffer are then clocked out to the transmitter with the aid of signals which are generated in a pulse-generating unit 30. The pulse-generating unit is connected to the internal real-time clock 31 of the base station. The internal real-time of the base station is referred to or is constituted by a time which is referred to solar time at the zero meridian in longitude, the so-called UTC time. In order to synchronize the base station shown in FIG. 1, a first time information common to all base stations is transmitted in from a centrally arranged coordinating unit, in the form of a GPS signal, to an element, arranged at the base station, for receiving the first common time information 26. The common time information which has come in is reprocessed in a communication element 32 provided for this purpose and is transferred to the time-comparing element 25 in a format which is comprehensible to the base station. A second time information is then transferred from the internal real-time clock 31 to the time-comparing element 25 whereupon the time-comparing element places the common time information in relation to the second time information. Existing criteria, for example delays and the like, are then introduced into the comparing element, 25 from a unit 33 intended for this purpose. The comparing element 25 then effects influences on/adjustments of the internal real-time clock in dependence on introduced criteria and on the relation between the common time information and the second time information, thereby providing for time synchronization of two or more base stations.

Figure 3:
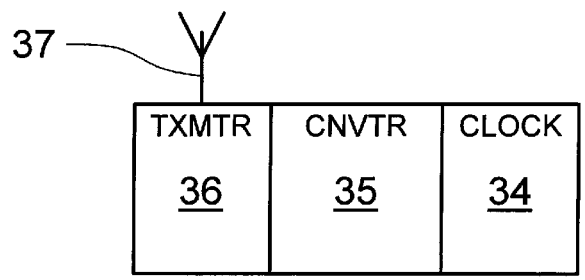
FIG. 3 shows in basic diagram form a central coordinating unit.

FIG. 3 shows a central coordinating unit. The central unit is provided with a clock 34, preferably an atomic clock. The atomic clock sends clock signals to a converter 35 which converts the clock pulses from the atomic clock to GPS signals. The GPS signals are then transferred from the converter to a transmitter 36 arranged in the central unit. An antenna element 37 is arranged at the transmitter 36. The transmitter 36 establishes contact with the base stations which are to be synchronized (preferably all the base stations in the system) and transmits synchronously to these base stations.

The invention is not limited by the embodiment shown as an example above but can be subjected to modifications within the scope of the subsequent patent claims and the concept of the invention.

We claim:

1. In a mobile telecommunication system including a number of base stations having transmitters and means for coordinating the base stations, an arrangement for providing for time coordination of a number of transmitters of the base stations, comprising in each base station:

a transmitting element which is arranged to operate with a respective real-time clock;

a time-comparing element;

means for receiving a first common time information transmitted from the coordinating means to the base stations, and for supplying the first common time information on to the time-comparing element together with a second time information set up from the real-time clock, the first common time information being stable over a long time period and the second time information being stable of short time period;

wherein the time-comparing element places the first common time information in relation to the second time information; the time-comparing element adjusts the real-time clock according to at least one predetermined criterion and a relation between the first common time information and the second time information for synchronizing the respective base station with at least one other base station; and the time-comparing element, the receiving means, and the real-time clock form a closed phase-locking system in which the receiving means processes the first common time information that is received into a format comprehensible to the time-comparing element, whereby the second time information is made stable over the long time period.

2. The arrangement of claim 1, wherein the real-time clock is set to UTC time.

3. The arrangement of claim 1, wherein the first common time information is a signal from a global positioning system.

4. The arrangement of claim 1, wherein the real-time clock produce timing information with a time delay that is respective to the base station and corresponding amount.

5. The arrangement of claim 1, wherein all base stations in the telecommunication network are synchronized.

6. The arrangement of claim 1, wherein the transmitting element operates with a buffer for storing outgoing transmit data that are clocked out to the transmitting element, and the transmitting element is responsive to a pulse-generating unit for generating the second time information set up from the real-time clock used in synchronized transmission.

7. The arrangement of claim 1, wherein a communication element is set up for transferring transmit data to the transmitting element and for transferring time information to the time-comparing element.

8. The arrangement of claim 1, wherein the telecommunication system is a digital network, preferably a paging system.

* * * * *